(12) United States Patent
Page

(10) Patent No.: US 11,873,237 B2
(45) Date of Patent: *Jan. 16, 2024

(54) FLUID CONDITIONING SYSTEMS AND METHODS

(71) Applicant: Mark K Page, Madison, OH (US)

(72) Inventor: Mark K Page, Madison, OH (US)

(73) Assignee: Mark K. Page, Madison, OH (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/410,231

(22) Filed: Aug. 24, 2021

(65) Prior Publication Data

US 2021/0380439 A1    Dec. 9, 2021

Related U.S. Application Data

(60) Continuation of application No. 17/000,932, filed on Aug. 24, 2020, now Pat. No. 11,097,964, which is a division of application No. 15/619,913, filed on Jun. 12, 2017, now Pat. No. 10,752,524.

(60) Provisional application No. 62/348,283, filed on Jun. 10, 2016.

(51) Int. Cl.
*C02F 1/46* (2023.01)
*C02F 1/461* (2023.01)
*B01J 47/00* (2017.01)

(52) U.S. Cl.
CPC ........ *C02F 1/46114* (2013.01); *C02F 1/4618* (2013.01); *B01J 47/00* (2013.01); *C02F 2201/461* (2013.01)

(58) Field of Classification Search
CPC ........ C02F 1/46; C02F 2201/461; B01J 47/00
See application file for complete search history.

(56) References Cited

U.S. PATENT DOCUMENTS 5,683,579 A * 11/1997 Lopes .................... C02F 1/488
210/243

* cited by examiner

*Primary Examiner* — Walter D. Griffin
*Assistant Examiner* — Cameron J Allen
(74) *Attorney, Agent, or Firm* — Ulmer & Berne LLP; John X. Garred

(57) ABSTRACT

A magnet positioning system for positioning magnets inside pipes includes a first stackable paddle that includes slots for accepting magnets and a second stackable paddle that includes a metal component for attracting the magnets and securing the magnets in the slots when the paddles are stacked together. Once stacked together, the paddles are inserted into position inside a pipe and the metal component is removed to release the magnets which move toward, and attach to, the inside wall of the pipe. A fluid conduit is positioned between the magnets using a spacer and a fixing agent permanently secures the magnets, fluid conduit, and spacer in place.

19 Claims, 7 Drawing Sheets

FLUID CONDITIONING SYSTEMS AND METHODS

CROSS-REFERENCE TO RELATED APPLICATIONS

This application is a Continuation of application Ser. No. 17/000,932 filed on Aug. 24, 2020, which is a Divisional of application Ser. No. 15/619,913 filed on Jun. 12, 2017 (now U.S. Pat. No. 10,752,524, issued on Aug. 25, 2020), which claims the benefit of U.S. provisional patent application Ser. No. 62/348,283, filed Jun. 10, 2016 and all are incorporated herein by reference in their entirety.

FIELD

The present application generally relates to conditioning fluids, and specifically to generating metal ions in a fluid using a non-metallic extension to extend a metallic anode into a flow of the fluid.

BACKGROUND

Ions such as copper ions, iron ions, and silver ions can be used in fluids to inhibit growth of organisms such as bacteria, germs, and algae or denature viruses. Ion generating systems can produce metal ions in electrolytic fluids by placing an electrical charge on a metal anode that is inserted into the fluid relative to a corresponding cathode. Ion generating systems can be used in fluid systems such as municipal water systems, private wells, and boilers, as well as process and cooling towers. However, many ion generating systems have an inherent design flow that causes the anodes and cathodes to foul quickly due to impurities in the fluids. Specifically, negatively charged impurities in the fluid can attach to a positively charged anode and positively charged impurities can attach to negatively charged cathode. The accumulating impurities can coat the anodes and cathodes and inhibit the generation of additional ions. If enough impurities are present, it can short out or damage the ion generating system. An example ion generating system can be found in U.S. Pat. No. 6,949,184B2.

SUMMARY

In a first example embodiment, an ion generator for fluids includes a pipe having a fluid inlet, a fluid exit, and an aperture for inserting an anode into a flow of fluid transferred between the fluid inlet and fluid exit. The ion generator includes an anode configured to be secured in the aperture. The anode includes a metallic portion such as a metal bar of iron, copper, silver, or gold that, when electrically charged, is configured to generate metal ions that are transferred into the fluid, and a rigid non-conductive extension that is configured to position at least some of the metallic portion into the flow of fluid in the pipe. The fluid can be an electrolytic fluid. The rigid non-conductive extension can be configured to position the entire metallic portion into the flow of fluid. In a configuration, at least some of the rigid non-conductive extension is not in a direct flow of the fluid. The anode can include a conductor that communicates electricity through the extension into the metallic portion. The conductor is configured to allow attachment of one lead of a power source to the anode. A complementary electrical connection allows a second lead of the power source to communicate electrically to the pipe which then operates as the cathode. The electrical connection can include a clamp configured to be secured to the outside of the pipe. The ion generator can include the associated power source configured to generate an electric potential between the anode and cathode. The ion generator can be configured to alternate the polarity of the electric potential applied to the anode and cathode. The aperture can include a receiving fitting and the anode can be secured to a cap that is configured to be fixably secured in the receiving fitting. The fluid inlet of the pipe can be configured to widen from a first diameter for attaching to standardized piping to a second larger diameter, where the second larger diameter compensates for the insertion of the metallic portion into the fluid flow by widening so as to approximately maintain the same fluid cross section of the pipe that exists at the fluid inlet. Similarly, the fluid exit can be tapered down to the first diameter to facilitated attachment to standardized piping. In a configuration, a cathode can be configured to be inside the aperture in proximity to the anode. The cathode can include a rigid non-conductive extension and metallic portion similar to the anode. The anode and cathode can be secured to a cap that can be configured to be removeably secured in the receiving fitting. The power source can apply an electric voltage between the anode and cathode, and the polarity between the anode and cathode can be alternated, for example using a switch.

In a second example embodiment, a method for generating ions in a fluid includes inserting a replaceable anode that has a metallic bar and a rigid non-conductive extension into a receiving aperture of a pipe that transfers fluid between an inlet and exit of the pipe such that at least a portion of the metallic bar is in a direct flow of the fluid and at least a portion of the rigid non-conductive extension is not positioned in the direct flow of the fluid. The method further includes applying a voltage to the replaceable anode from an associated power supply and generating metal ions in the fluid from the replaceable anode as a result of the application of the voltage. The method can include inserting a replaceable cathode into the receiving aperture with the replaceable anode, where at least a portion of a second metallic bar of the replaceable cathode is in the direct flow of the fluid and at least a portion of a second rigid non-conductive extension is not in the direct flow of the fluid. The method can include applying the voltage between the replaceable anode and the replaceable cathode for generating the metal ions.

In a third example embodiment, an apparatus for positioning magnets in a ferrous cylinder includes a first stackable paddle have one or multiple slots each configured to accept a magnet, and a second stackable padded having a ferrous rod configured to magnetically attract each of the magnets when the first and second stackable paddles are stacked. The stacked paddles are configured to be inserted together into the ferrous cylinder. The stacked paddles are configured such that removing the second stackable paddle from the ferrous cylinder prior to removing the first stackable paddle results in each magnet magnetically attaching to the inside wall of the ferrous cylinder. One or more gauges can be configured to check the placement of the magnets in the ferrous cylinder. A spacer can be configured to position a fluid conduit insider the ferrous cylinder in proximity of the magnets, and the space, fluid conduit, and magnets can be fixed in place with a fixing agent such as a cement, glue, or other solidifying substance.

In a fourth example embodiment, an apparatus for vacuuming a water basin can include a vacuum inlet configured to remove sediment in the base through a vacuum line that is in fluid communication with the vacuum inlet, and a plurality of jets configured to produce horizontal streams of water at low pressure and at low volume. The jets are configured such that when a jet is in proximity to a wall above a corner, at least some of the water from the jet will push at least some debris resting near the corner towards the vacuum inlet.

DETAILED DESCRIPTION

Figure 1:
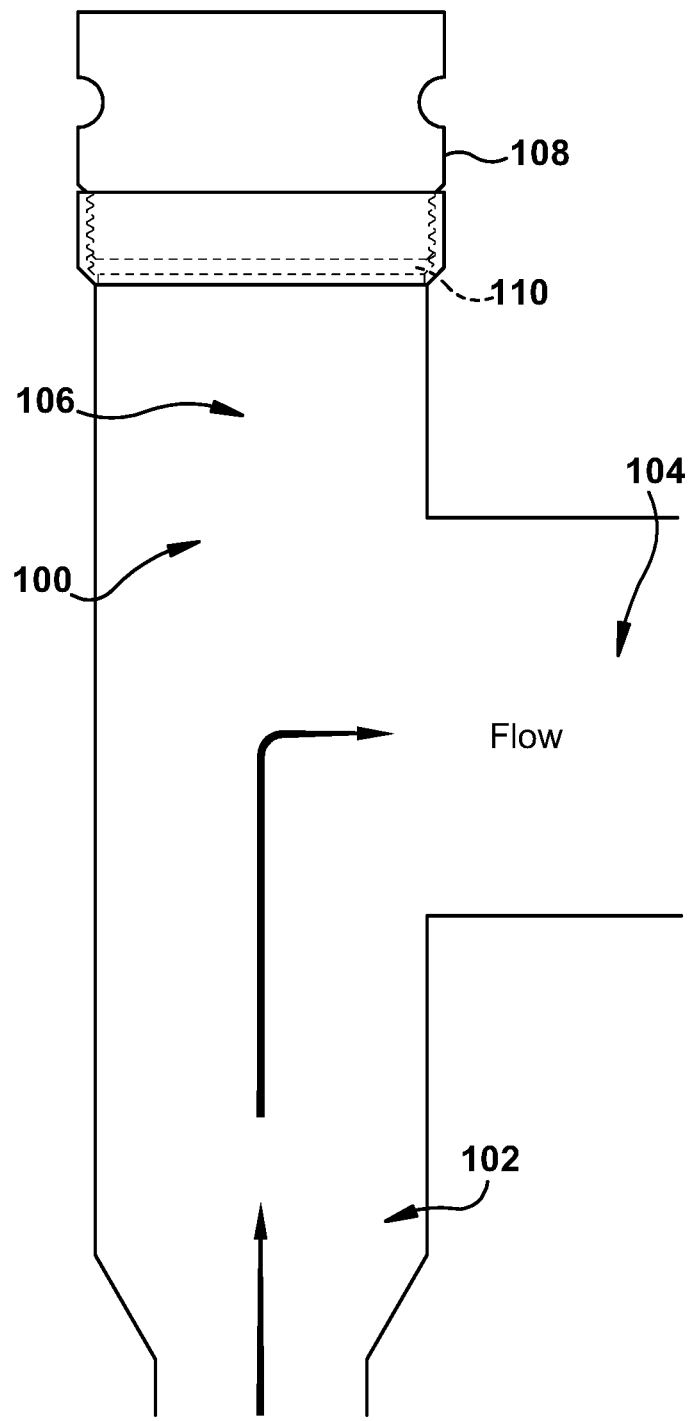
FIG. 1 is a diagram of an example pipe for transferring a fluid in an embodiment of the present application.

With reference to FIG. 1, a pipe 100 having a T-configuration is presented. The pipe 100 includes a fluid inlet 102, a fluid exit 104, and an insertion aperture 106. The insertion aperture 106 includes a receiving fitting 108 and a gasket 110 configured to create a leak proof seal. Fluid in the pipe 100 flows in from the fluid input 102, past the insertion aperture 106, and out through the fluid exit 104 as illustrated by the arrow marked "flow".

Figure 2:
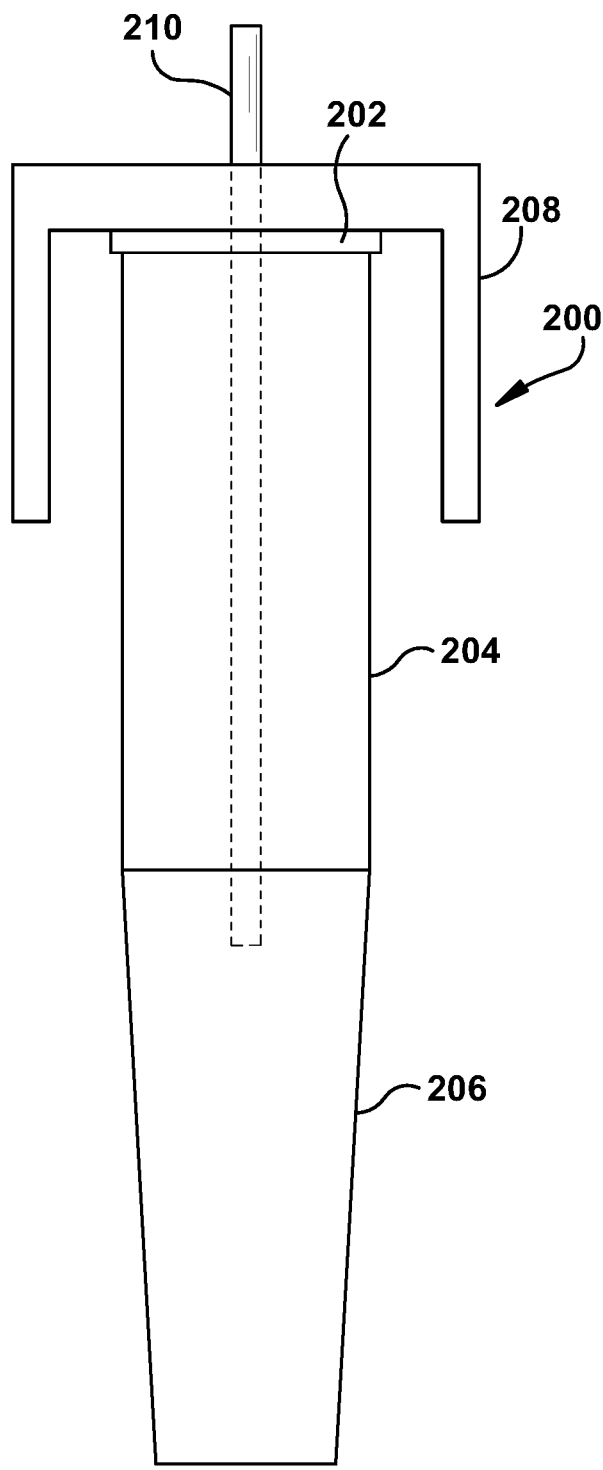
FIG. 2 is a diagram of an example anode in an embodiment of the present application.

With reference to FIG. 2, an ion generating anode 200 for use in the pipe 100 of FIG. 1 is presented. The ion generating anode 200, shown with a partial cutaway view of the cap 208, includes the cap 208, a gasket 202, a ridged non-conducting extension 204, a metallic bar 206, and a center conductor 210 that extends from outside the cap 208, through the gasket 202, through the ridged non-conducting extension 204, and into the metallic bar 206. In a configuration, the center conductor 210 can be positioned off center. The metallic bar can be any suitable metal for generating ions and any suitable shape. For example, the metallic bar can be a bar of iron, copper, silver, or gold, or any combination of metals. The metallic bar can be solid, or can be coated with the desired metal. Any suitable shape such as cylindrical, rectangular, rounded or angular can be used as would be understood in the art.

Figure 3:
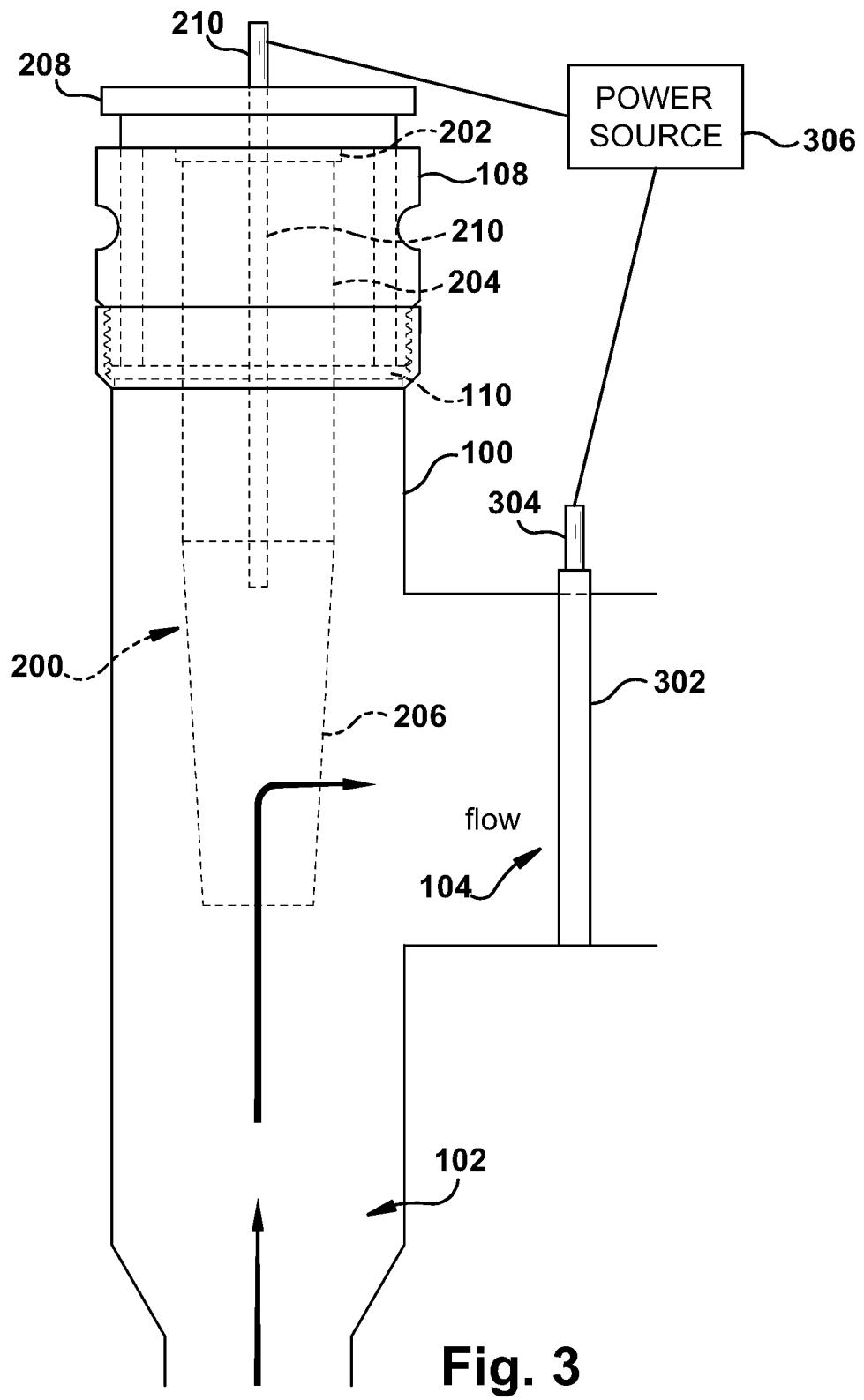
FIG. 3 is a diagram of the pipe of FIG. 1 combined with the anode of FIG. 2 in an embodiment the present application.

With reference to FIG. 3, an assembled ion generating system 300 includes the ion generating anode 200 of FIG. 2 positioned inside the receiving fitting 108 of FIG. 1. The ion generating anode 200 can be secured in the receiving fitting 108 using known securing features such as screw threading or pressure coupling as would be understood in the art. The receiving fitting 108 facilitates removal and replacement of the ion generating anode 200. A grounding clamp 302 with an electrical contact 304 is attached to the pipe 100, thus allowing the pipe 100 to function as the cathode. In a configuration, the electrical contact 304 can be directly attached or integrated with the pipe 100, for example using a threaded connector into the pipe or by using a nipple extending from the pipe. Additional detailed descriptions associated with reference numbers in FIG. 3 can be found above for the corresponding reference numbers in the detailed description for FIGS. 1 and 2. Fluid in the pipe 100 flows from the fluid inlet 102, past the metallic bar 206, and exits through the fluid exit 104 as illustrated by the arrow line marked "flow". The ridged non-conducting extension 204 of the ion generating anode 200 allows a portion of, or all of, the metallic bar 206 to be place within the fluid flow. To prevent the metallic bar 206 from restricting the fluid flow, the pipe 100 can be made wider to ensure that the volumetric flow of fluid remains substantially the same when the metallic bar 206 is placed in the fluid flow. For example, by widening the pipe 100 relative to the piping leading into or out of the pipe 100, the fluid cross-section of the pipe 100 can remain substantially the same as the fluid cross-section of the pipes leading into and out of the assembled ion generating system 300. For example, the fluid inlet 102 can expand from an initial internal diameter d where the pipe 100 connects to other piping to a larger internal diameter d' as shown. Similarly, the fluid exit 104 can taper to an internal diameter d in order for the pipe 100 to match other piping (not shown). For example, if standard two inch piping is used as the diameter d for the pipes leading into and out of the pipe 100, then the diameter d' can be widened to compensate for additional volume or cross-section occupied by the metallic bar 206. For example, the fluid inlet can widen d' relative to d to compensate for space occupied by the metallic bar 206 in the fluid flow. In various configurations, the pipe 100 can widen and/or taper suitable places along the pipe, depending upon the desired flow characteristics and physical shape of the metallic bar 206. In an alternative embodiment, the assembled ion generating system 300 can be configured as a side stream loop (not shown) or use other known piping configurations as would be understood in the art. For example, a side stream loop can be achieved by installing suitable throttle valves, T-shaped pipes with directional scoops, or installing separate pumping as would be understood in the art.

In operation, a power source 306 is electrically connected to the assembled ion generating system 300 by making electric connections between the power source 306 and the center conductor 210 and electrical contact 304 associated with the grounding clamp 302. A suitable power source 306 can include a DC power source, such as a battery or DC-to-DC converter, or an AC-to-DC power source that can convert 220 Volt or 110 Volt line voltage to a suitable DC voltage. An example suitable DC voltage can be approximately 12-15 Volts at 3-5 Amps, although other suitable ranges of voltages and amperages could be used as would be understood in the art. A voltage can be applied to the center conductor 210 and the electrical contact 304, for example a positive charge can be applied to the center conductor 210 and a corresponding negative charge can be applied to the electrical contact 304. When the fluid in the pipe 100 is an electrolytic fluid, the voltage difference between the center conductor 304 and electrical contact 304 can cause metal ions to disassociate from the metallic bar 206 and enter the fluid.

By placing the metallic bar 206 in the fluid flow, the fluid can continuously scrub the ion generating area and ensure that metal ions continue to be introduced into the fluid. When the fluid is under pressure, such as may occur in heating or cooling applications, the pressurized fluid provides additional scrubbing capability to the ion generating area. Additionally, in a configuration, the power source 306 can be configured to reverse polarity, causing the anode and cathode to switch respective to one another. The reversing of the polarity can be caused by a timer as would be understood in the art.

Figure 4:
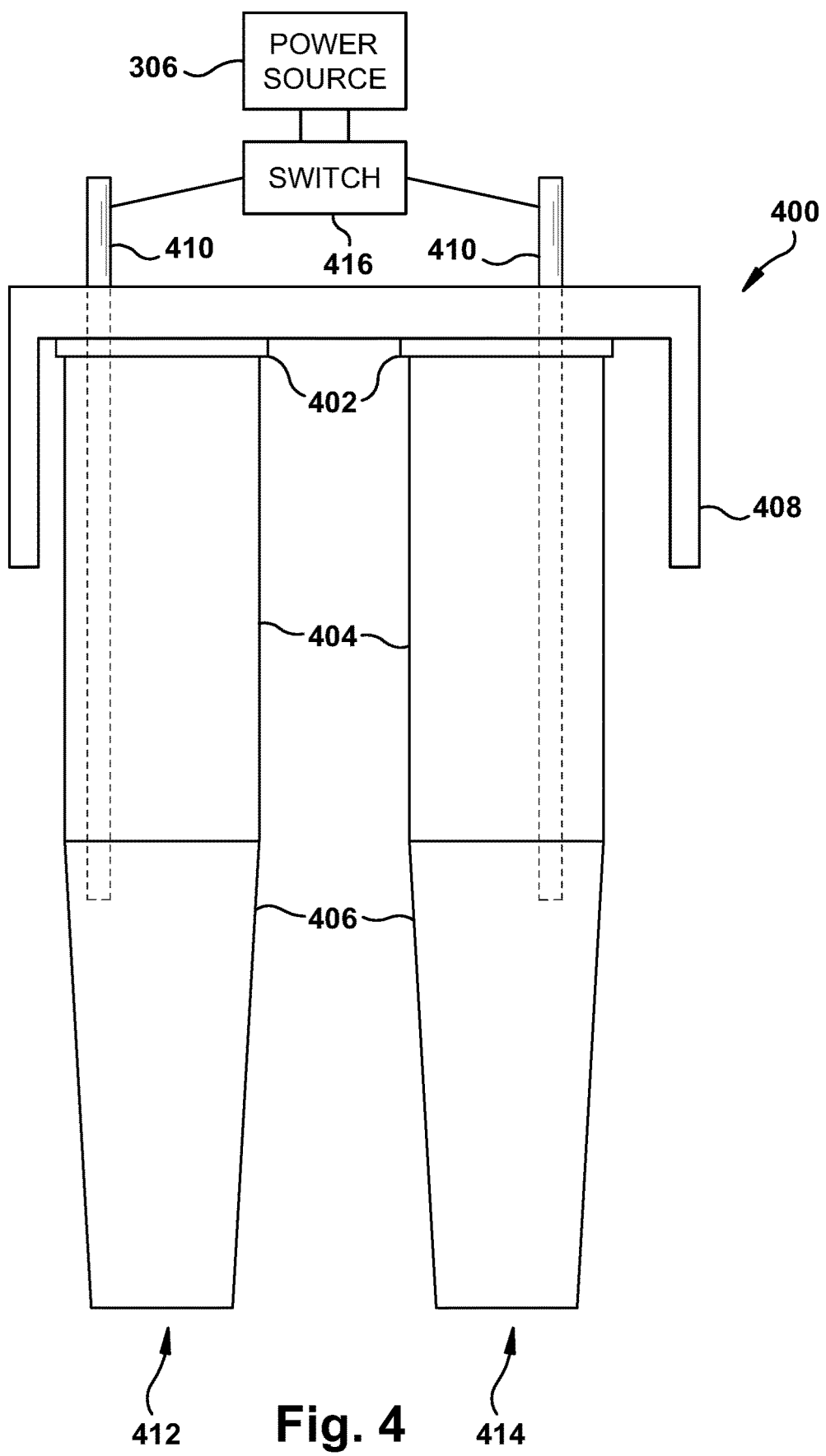
FIG. 4 is a diagram of an example combined anode and cathode in an embodiment of the present application.

With reference to FIG. 4, a combination ion generator 400 can include two or more conductive members 412, 414 that function as the anode and cathode. Advantageously, the combination ion generator 400 can be used in situations where using the pipe as a cathode would be impractical or disadvantageous. For example, the combination ion generator 400 allows the pipe to be non-conductive pipe, as the pipe is not needed as the cathode. The combination ion generator 400 can be used for extra low maintenance operations as the pipe would no longer experience potential buildup of impurities due to the pipe being used as the cathode. Also, the fluid can scrub both the anode and the cathode as both would be inserted into the fluid flow. The combination ion generator 400 advantageously allows both the cathode and anode to be serviced or replaced at the same time. Also, the combination ion generator 400 advantageously allows the conductive members 412, 414 to be used alternatively as the sacrificial anode that releases metal ions. By promoting even consumption of both conductive members 412, 414, the service window for replacement can be approximately doubled compared with the ion generating anode 200 of FIG. 2 that only includes a single anode and no cathode.

Each of the conductive members 412, 414 can include a rubber gasket 402 for leak proof sealing, a ridged non-conducting extensions 404, a metallic bar 406, and center conductors 410 that can be positioned off center as shown. The conductive members 412, 414 can be connected to the cap 408 which is configured to be inserted into the receiving fitting 108 of the pipe 100 of FIG. 1. As described above, a suitable power source 306 can be attached to the center conductors 410. The polarity of the voltage applied to the conductive members 412, 414 can be cycled between a first polarity and a second polarity.

In an embodiment, a switch 416 can be used to alternate the functions of each the conductive members 412, 414 between anode and cathode. For example, the switch 416 can include a timer configured to select the first conductive member 412 as the anode and the second conductive member 414 as the cathode for a first period of time, and then select the first conductive member 412 as the cathode and the second conductive member 414 as the anode for a second period of time. The switch 416 then periodically reverses the polarities of each of the conductive member 412, 414. Advantageously, the use of the switch 416 allows a standard power source 306 to be used. In a configuration, the switching function can be integrated into the power source 306.

Figure 5A:
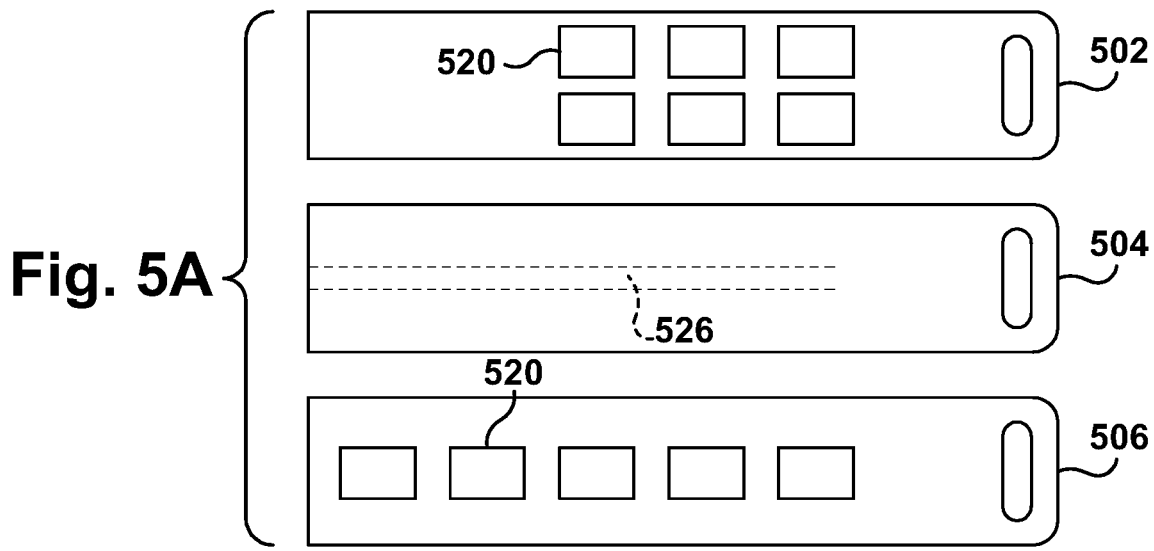
FIG. 5A is a diagram of example magnet positioning paddles in an embodiment of the present application.
Figure 5B:
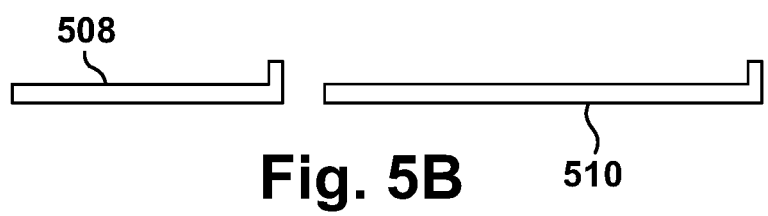
FIG. 5B is a diagram of an example non-ferrous transfer cylinder with the magnet positioning paddles of FIG. 5A in an embodiment of the present application.

With reference to FIG. 5A, stackable non-magnetic positioning paddles 502, 504, 506 are reusable devices for positioning magnets (not shown) in ferrous cylinders at specific positions to achieve precise magnetic fields. The field strengths, field distances, and field patterns of the magnetic fields can be configured based on the type of fluid, the velocity of the fluid, and the size of the fluid conduit or pipe. With reference to FIG. 5B, gauging tools 508, 510 can assist in checking that the magnets inserted into the ferrous cylinders are in the proper positions at the proper depths and with proper spacing. The stackable non-magnetic positioning paddles 502, 504, 506 and gauging tools 508, 510 advantageously assist in the production and quality control of magnetic fluid conditioning equipment.

Figure 5F:
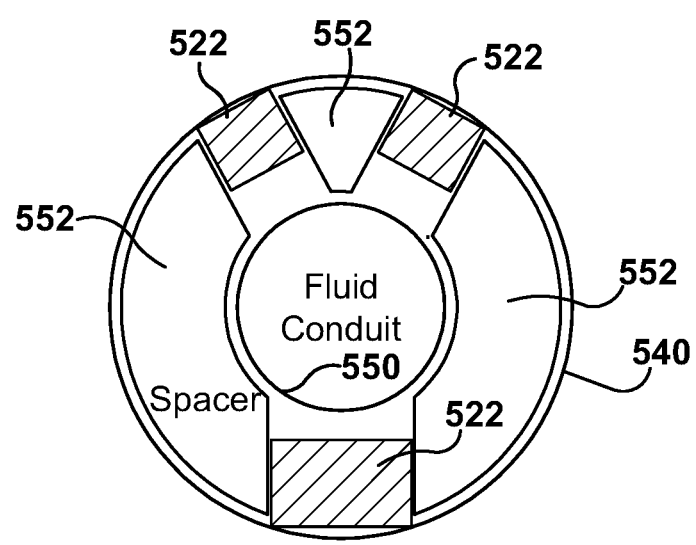
FIG. 5F is a diagram of the ferrous pipe section of FIG. 5C with positioned magnets, spacers, and fluid conduit in an embodiment of the present application.
Figure 5C:
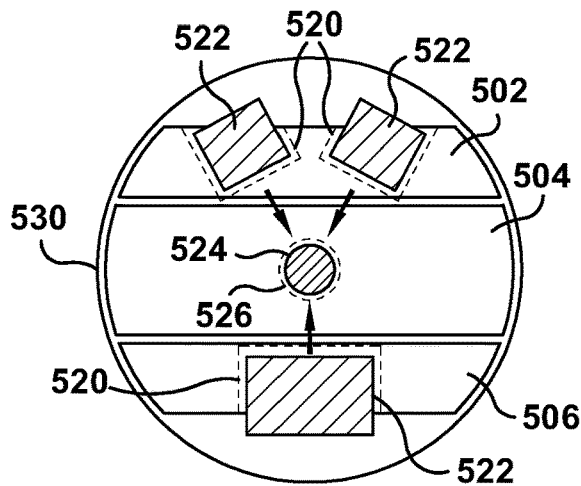
FIG. 5C is a diagram of an example ferrous cylinder positioned next to the non-ferrous transfer cylinder of FIG. 5B in an embodiment of the present application.

With reference to FIGS. 5A and 5C, the stackable non-magnetic positioning paddles 502, 504, 506 are stacked together. A ferrous rod 524, such as a steel rod, is positioned in a center hole in the center stackable non-magnetic positioning paddle 504. Magnets 522 are placed into cut outs 520 in stackable non-magnetic positioning paddles 502 and 506. The magnets 522 can be any suitable size or shape, and be made of suitable materials such as rare earth magnets as would be understood in the art. Stackable non-magnetic positioning paddles 502 and 506 can have cut outs 520 in different positions or can be identical, depending upon the desired configuration of magnets 522 in the resulting ferrous cylinder 540 shown in FIGS. 5D, 5E, and 5F. Because the magnets are magnetically attracted to the ferrous rod 524, the magnets 522 stay in place in the cut outs 520. The stackable non-magnetic positioning paddles 502, 504, 506 with the magnets 522 and ferrous rod 524 in place are then placed into a non-ferrous transfer cylinder 530.

Figure 5D:
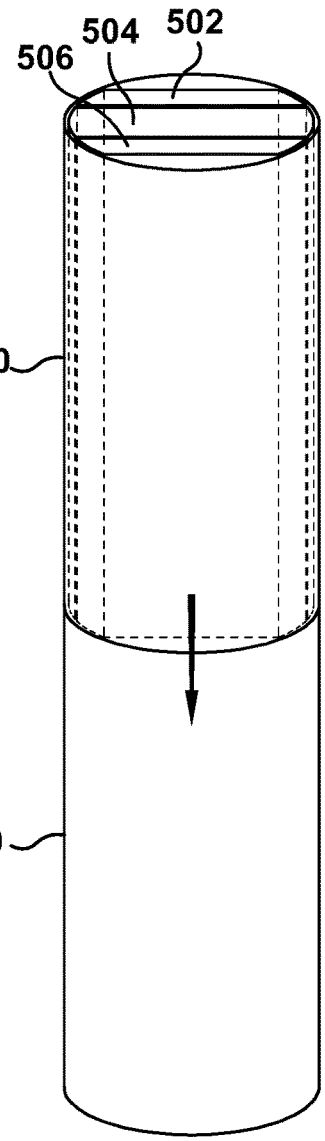
FIG. 5D is a diagram of the ferrous cylinder of FIG. 5C with magnet positioning paddles in an embodiment of the present application.

With reference to FIG. 5D, the non-ferrous transfer cylinder 530 can have the same or a slightly smaller inside diameter than a ferrous cylinder 540 to facilitate transfer of the magnetic paddles from the non-ferrous transfer cylinder 530 to the ferrous cylinder 540. The non-ferrous transfer cylinder 530 is butted up to the ferrous cylinder 540. The stacked non-magnetic positioning paddles 502, 504, 506 are pushed from the non-ferrous transfer cylinder 530 into the ferrous cylinder 540. The non-ferrous transfer cylinder 530 can be set aside for future reuse.

Figure 5E:
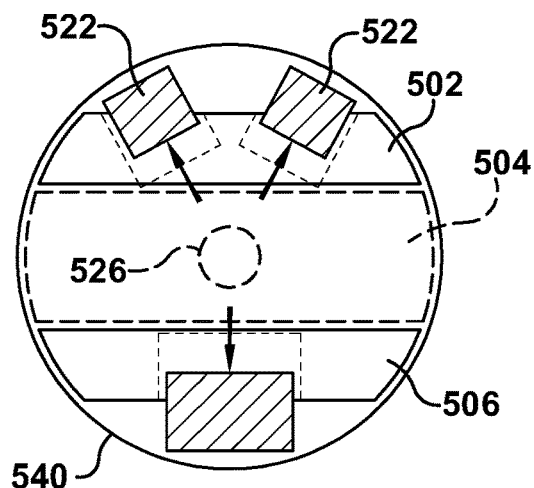
FIG. 5E is a diagram of example magnet positioning gauges in an embodiment of the present application.

With reference to FIG. 5E, the center stackable non-magnetic positioning paddle 504 is removed from the ferrous cylinder 540. In an alternative operation, the ferrous rod 524 can be removed first from the center hole in the center stackable non-magnetic positioning paddle 504, and then the center stackable non-magnetic positioning paddle 504 can be removed from the ferrous cylinder 540. Once the ferrous rod 524 is removed, either separately or with the center stackable non-magnetic positioning paddle 504, the magnets 522 will attach to the inside wall of the ferrous cylinder 540 due to magnetic attraction. The other stackable non-magnetic positioning paddles 502, 506 can then be moved inward into the space formerly occupied by the center stackable non-magnetic positioning paddle 504 and removed. Advantageously, the stacked non-magnetic positioning paddles 502, 504, 506 can have different widths to facilitate removal of stackable non-magnetic positioning paddles 502, 506. For example, the center stackable non-magnetic positioning paddle 504 can have a width d, while the other stackable non-magnetic positioning paddles 502, 506 can have widths<d to allow better clearance from the magnets 522 when removing the stackable non-magnetic positioning paddles 502, 506. The gauges from FIG. 5B can be used to check that the magnets 522 are correctly positioned.

With reference to FIG. 5F, a non-ferrous fluid conduit 550 can be placed down the middle of the ferrous cylinder 540. Optional spacers 552 can be used to hold the fluid conduit 550 in place. An end cap (not shown) can be placed on a first end of the ferrous cylinder 540 and the ferrous cylinder 540 can be placed on that end. The space between the fluid conduit 550 and the inside wall of the ferrous cylinder 540 can be filled with a fixing agent, such as a cement or quick hardening slurry, that permanently secures the magnets 522 and the fluid conduit in position. A second end cap (not shown) can be placed on a second end of the ferrous cylinder 540. The end caps include apertures that allow the fluid conduit 550 to extend through the end caps. Example non-ferrous fluid conduits can include pipes or tubes as would be understood in the art. In a configuration, the magnets 522 can be shaped so as to increase contact area with the insider wall of the ferrous cylinder 540 or to increase the magnetic field in the non-ferrous fluid conduit 550. For example, the magnets 522 can have an outside arced surface of approximately the same radius as the ferrous cylinder 540 or an inside arced surface of approximately the same radius as the non-ferrous fluid conduit 550.

Cooling towers are typically formed with 90-degree corners and side panels. These sharp 90-degree angles can promote the build-up of sediment which can become a foothold for bacteria and algae to grow and proliferate. To maintain efficiency and biological control, it can be necessary to clean cooling tower basins. In the past this has been done using high pressure and high volume water jets to push debris towards a drain in the basin. This requires large, expensive pumps which can leave sediment accumulations throughout the basin due to the difficulty of moving the debris using along a flat basin using water jets in water.

Figure 6A:
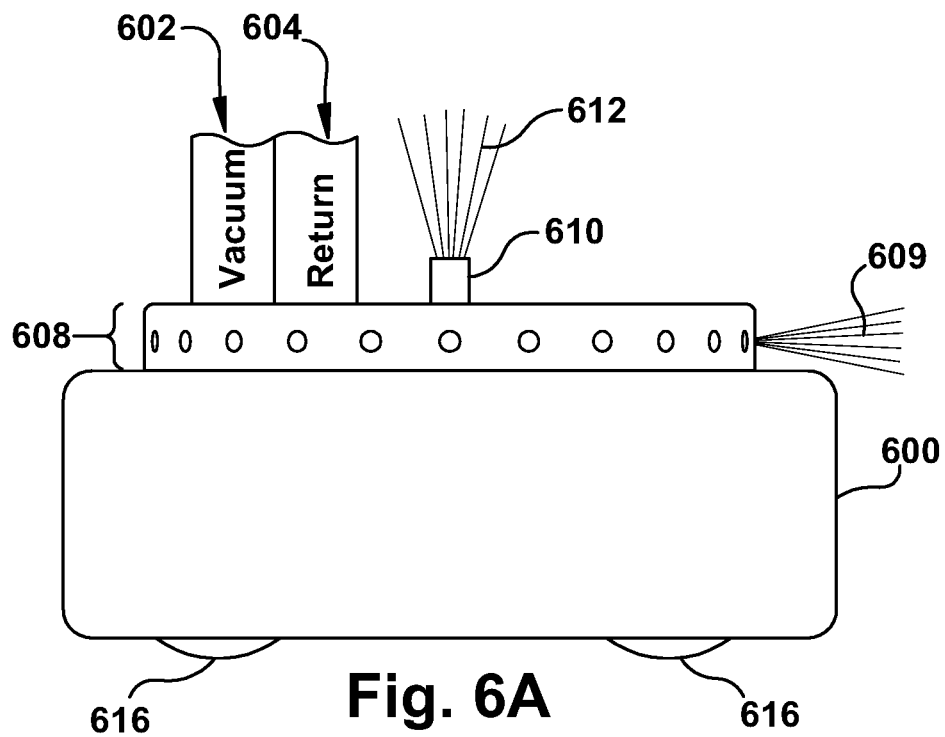
FIG. 6A is a side view of a cooling tower basin cleaner in an embodiment of the present application.
Figure 6B:
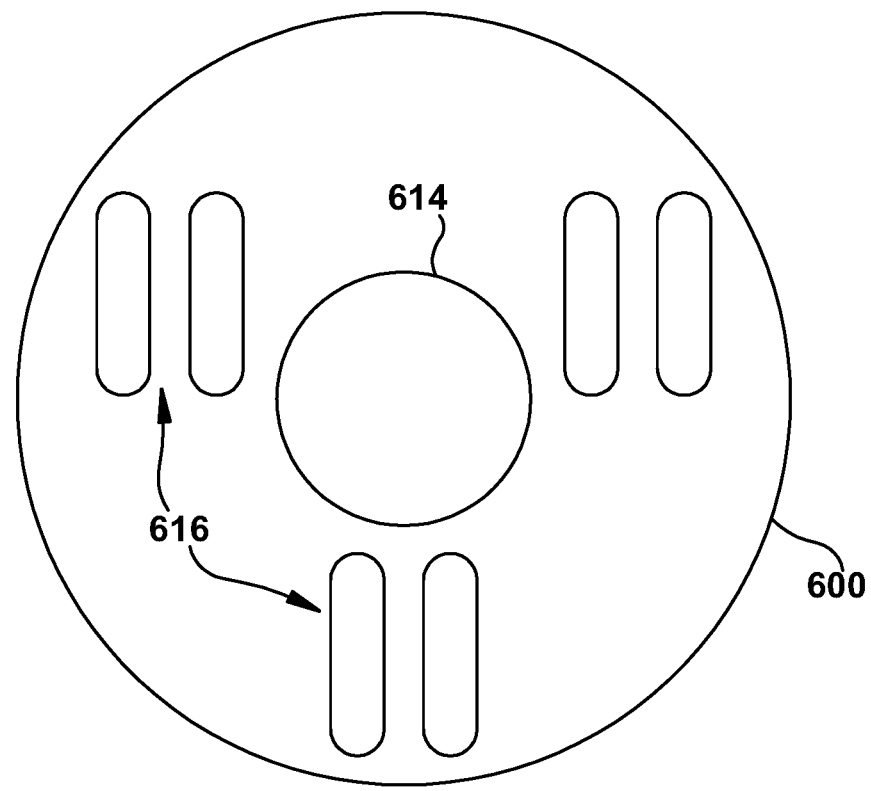
FIG. 6B is a bottom view of the cooling tower basin cleaner of FIG. 6A in an embodiment of the present application.

With reference to FIG. 6A, a side view of a cooling tower basin cleaner 600 is presented. With reference to FIG. 6B, a bottom view of the cooling tower basin cleaner 600 is presented. The cooling tower basin cleaner 600 comprises a vacuum line 602, a water return line 604, a manifold 608 having a plurality of jets 606, a spray nozzle 610, a vacuum intake 614 and a plurality of wheels 616. The vacuum intake 614 is in fluid communication with the vacuum line 602. The plurality of jets 606 are in fluid communication with the water return line 604.

The water return line 604 is pressurized, and the jets 606 direct water from the water return line 604 out of the jets 606 in a substantially horizontal manner. When the cooling tower basin cleaner 600 is not near an edge or corner of the basin, the water directed horizontally out of the jets 606 generally will not perturb sediment on the basin floor, thus allowing the vacuum intake 614 to retrieve sediment from the basin floor and direct it into the vacuum line 602 where the sediment is removed from the basin. When the cooling tower basin cleaner 600 is in close proximity to an edge or corner of the basin, the water directed horizontally out of the jets 606 will hit a wall of the basin, perturb the water near the edge or corner, and push debris away from the wall, allowing the vacuum intake 614 to retrieve the displaced sediment. In a configuration, the jets 606 can be configured to be low volume and low pressure. Advantageously, using low volume, low pressure streams can reduce the amount of perturbation of the water that otherwise could lead to the sediment being picked up, carried by currents in the water, and redeposited elsewhere in the basin. A low volume, low pressure stream from one or more jets 606 can gently move debris away from the wall with perturbing the debris so that the debris becomes suspending in the water.

The spray nozzle 610 can be configured to generate a locator spray 612. For example a portion of the water from the pressurized water return line 604 can be redirected to generate the locator spray 612. The locator spray 612 advantageously can provide a visible indicator to an operator as to where the cooling tower basin cleaner 600 is within a cooling tower basin. For example, the locator spray 612 can produce a ripple or movement of water directly above the cooling tower basin cleaner 600 that can provide a visible ripple or bubbling on the surface of the water that indicates the position of the cooling tower basin cleaner 600 to the operator. In various configurations, the water returned via the water return line 604 can be substantially water, or can include some air bubbles to aid in position detection.

The plurality of wheels 616 can be configured to move the cooling tower basin cleaner 600 around the basin floor. For example a portion of the water from the pressurized water return line 604 can be redirected to drive the wheels 616. In a configuration, the wheels 616 can electrically powered for example using a battery by delivering power and/or control signals via wires to the cooling tower basin cleaner 600.

In light of the foregoing, it should be appreciated that the present disclosure significantly advances the art of ion generation in fluids and magnetic conditioning of fluids. While example embodiments of the disclosure have been disclosed in detail herein, it should be appreciated that the disclosure is not limited thereto or thereby inasmuch as variations on the disclosure herein will be readily appreciated by those of ordinary skill in the art. The scope of the application shall be appreciated from the claims that follow.

What is claimed is:

1. An apparatus for positioning magnets in a ferrous fluid bearing cylinder, comprising:
   a first stackable paddle having a plurality of slots each configured to accept one of a plurality of magnets positioned in accordance with a fluid property, fluid velocity or size of the ferrous cylinder relative to field strengths, field distances or field patterns of magnetic fields associated with the magnets; and a second stackable paddle configured to secure each magnet in an associated slot when the second stackable paddle is stacked with the first stackable paddle,
   wherein the first stackable paddle and second stackable paddle are configured to be inserted together into a ferrous cylinder when stacked, and
   wherein removing at least a portion of the second stackable paddle from the ferrous cylinder prior to removing the first stackable paddle from the ferrous cylinder releases each magnet from the associated slot and allows each magnet to magnetically attach to an inside wall of the ferrous cylinder.

2. The apparatus of claim 1, further comprising:
   a third stackable paddle having one or more slots, each slot configured to accept an associated magnet,
   wherein the third stackable paddle is configured to be stacked with the first stackable paddle and the second stackable paddle and inserted into the ferrous cylinder,
   wherein removing at least a portion of the second stackable paddle from the ferrous cylinder releases the associated magnet from the associated slot allowing each magnet to magnetically attach to the inside wall of the ferrous cylinder.

3. The apparatus of claim 1, wherein the second stackable paddle comprises a ferrous material configured to attract each magnet and secure each magnet in the associated slot when stacked with the first stackable paddle, and wherein removing the second stackable paddle from the ferrous cylinder releases each magnet from the associated slot.

4. The apparatus of claim 1, further comprising:
   a selectively removable ferrous rod associated with the second stackable paddle, the ferrous rod configured to attract each magnet and secure each magnet in the associated slot when the second paddle is stacked with the first stackable paddle, and wherein selectively removing the ferrous rod from the second stackable paddle releases each magnet from the associated slot.

5. The apparatus of claim 1, wherein when the second stackable paddle is removed from the ferrous cylinder, the first stackable paddle is configured to be removable from the ferrous cylinder without displacing each magnet that is magnetically attached to the inside wall of the ferrous cylinder.

6. The apparatus of claim 1, further comprising:
a non-metallic transfer cylinder configured to facilitate insertion of the stacked first stackable paddle and second stackable paddle from the non-metallic transfer cylinder into the ferrous cylinder.

7. The apparatus of claim 1, further comprising:
a gauge configured to check the placement of at least one magnet in the ferrous cylinder.

8. The apparatus of claim 1, further comprising:
a fluid conduit configured to be inserted inside the ferrous cylinder proximate to the magnets attached to the inside wall of the ferrous cylinder.

9. The apparatus of claim 1, further comprising:
a fixing agent configured to permanently secure the fluid conduit and magnets inside the ferrous cylinder.

10. The apparatus of claim 9, further comprising:
a spacer configured to position the fluid conduit inside the ferrous cylinder in proximity to the magnets,
wherein the spacer, fluid conduit, and magnets are configured to be fixed in place using the fixing agent.

11. A method of positioning magnets in a ferrous fluid bearing cylinder comprising:
inserting a plurality of magnets into a slots of a first stackable paddle having a plurality of slots configured to accept the magnets positioned in accordance with a fluid property, fluid velocity or size of the ferrous cylinder relative to field strengths, field distances or field patterns of magnetic fields associated with the magnets;
stacking the first stackable paddle with a second stackable paddle that is configured to secure the magnets in the slots;
inserting the stacked first stackable paddle and second stackable paddle into the ferrous cylinder;
removing at least a portion of the second stackable paddle from the ferrous cylinder to release the plurality of magnets from the associated slot which allows the plurality of magnets to magnetically attach to an inside wall of the ferrous cylinder.

12. The method of claim 11, further comprising:
inserting a second magnet into a third stackable paddle having one or more slots configured to accept the second magnet, stacking the third stackable paddle with the first stackable paddle and the second stackable paddle prior to insertion into the ferrous cylinder,
wherein removing the second stackable paddle from the ferrous cylinder releases the second magnet from an associated slot and allows the second magnet to magnetically attach to an inside wall of the ferrous cylinder.

13. The method of claim 11, wherein the second stackable paddle comprises a ferrous material configured to attract one of the plurality of magnets and secure it in the associated slot when the second paddle is stacked with the first stackable paddle, and further comprising:
removing the second stackable paddle from the ferrous cylinder to release the magnet from the associated slot.

14. The method of claim 11, wherein the second stackable paddle comprises a ferrous rod configured to attract one of the plurality of magnets and secure it in the associated slot when the second paddle is stacked with the first stackable paddle, and further comprising: removing the ferrous rod from the second stackable paddle to release the magnet from the associated slot.

15. The method of claim 11, further comprising:
inserting the stacked first stackable paddle and second stackable paddle into a non-ferrous transfer cylinder prior to insertion into the ferrous cylinder, and
wherein inserting the stacked first stackable paddle and second stackable paddle into the ferrous cylinder comprises pushing the stacked first stackable paddle and second stackable paddle from the non-ferrous transfer cylinder into the ferrous cylinder.

16. The method of claim 11, further comprising:
checking the position of one of the plurality of magnets using a gauge configured to check its placement in the ferrous cylinder.

17. The method of claim 11, further comprising:
inserting a fluid conduit inside the ferrous cylinder proximate to one of the plurality of magnets attached to the inside wall of the ferrous cylinder;
inserting a spacer configured to position the fluid conduit inside the ferrous cylinder in proximity to the one of the plurality of magnets;
inserting a fixing agent into the space between the fluid conduit and the inside wall of the ferrous cylinder to fix in place the fluid conduit, the spacer, and the one of the plurality of magnets.

18. A system for positioning magnets in a fluid bearing pipe comprising:
a first paddle with slots configured to accept magnets so as to be positioned in accordance with a fluid property, fluid velocity or size of the fluid filled pipe relative to field strengths, field distances and field patterns of magnetic fields associated with the magnets;
a second paddle that includes a removable metal bar configured to attract the magnets and secure the magnets in the slots when the second paddle is stacked with the first paddle,
wherein the first paddle and second paddle are configured to be inserted together into the pipe when stacked together, and
wherein removing the removable metal bar from the second paddle releases the magnets from the slots, allowing the magnets to move to the inside wall of the pipe.

19. The system of claim 18, further comprising:
a fluid conduit configured to be disposed inside the pipe between the magnets;
a spacer configured to position the fluid conduit inside the pipe in proximity to the magnets;
a fixing agent configured to be disposed in the space between the fluid conduit, the magnets, and the inside wall of the pipe to fix in place the spacer, the fluid conduit, and the magnets.

* * * * *